(12) United States Patent
Maeda et al.

(10) Patent No.: US 7,502,304 B2
(45) Date of Patent: Mar. 10, 2009

(54) DATA RECORDING AND REPRODUCING DEVICE, DATA RECORDING AND REPRODUCING METHOD, AND RECORDING MEDIUM

(75) Inventors: Takanori Maeda, Saitama (JP); Atsushi Onoe, Saitama (JP)

(73) Assignee: Pioneer Corporation, Tokyo (JP)

( * ) Notice: Subject to any disclaimer, the term of this patent is extended or adjusted under 35 U.S.C. 154(b) by 406 days.

(21) Appl. No.: 10/568,700

(22) PCT Filed: Jul. 29, 2004

(86) PCT No.: PCT/JP2004/011192

§ 371 (c)(1),
(2), (4) Date: Feb. 17, 2006

(87) PCT Pub. No.: WO2005/020226

PCT Pub. Date: Mar. 3, 2005

(65) Prior Publication Data

US 2006/0182004 A1  Aug. 17, 2006

(30) Foreign Application Priority Data

Aug. 20, 2003 (JP) ............................. 2003-208041

(51) Int. Cl.
G11B 7/00 (2006.01)

(52) U.S. Cl. .................................................. 369/126
(58) Field of Classification Search ................. 369/126, 369/100

See application file for complete search history.

(56) References Cited

U.S. PATENT DOCUMENTS

| | | |
|---|---|---|
| 5,012,363 A | 4/1991 | Mine et al. |
| 5,394,388 A | 2/1995 | Hatanaka et al. |
| 5,490,132 A | 2/1996 | Yagi et al. |
| 5,526,334 A | 6/1996 | Yamano et al. |
| 5,757,760 A | 5/1998 | Shido et al. |
| 6,195,313 B1 | 2/2001 | Seki et al. |

FOREIGN PATENT DOCUMENTS

| | | | |
|---|---|---|---|
| EP | 0 327 207 A | | 8/1989 |
| EP | 1365395 A2 | * | 11/2003 |
| JP | 4-90151 | | 3/1992 |
| JP | 2003-346392 | | 12/2003 |

OTHER PUBLICATIONS

International Search Report of PCT/JP2004/011192, mailed Dec. 14, 2004.

* cited by examiner

*Primary Examiner*—Nabil Z Hindi
(74) *Attorney, Agent, or Firm*—Nixon & Vanderhye, PC

(57) ABSTRACT

A position control area (76A) is partly formed in the recording area (75) of a recording medium (70) and position information is recorded only in the position control area (76A). To record data in the recording medium (70) by a head (60) having a plurality of cantilevers (62A), (62B), . . . , the position information is read by the cantilever (62E) corresponding to the position control area (76A) and, based on the position information, the positioning control or moving control of all the other cantilevers is performed.

16 Claims, 7 Drawing Sheets

DATA RECORDING AND REPRODUCING DEVICE, DATA RECORDING AND REPRODUCING METHOD, AND RECORDING MEDIUM

This application is the US national phase of international application PCT/JP2004/011192, filed 29 Jul. 2004, which designated the U.S. and claims priority of JP 2003-208041, filed 20 Aug. 2003, the entire contents of each of which are hereby incorporated by reference.

TECHNICAL FIELD

The present invention relates to a data recording/reproducing apparatus for and a data recording/reproducing method of recording data onto a recording medium or reproducing the data recorded on the recording medium, by using a probe, cantilever, or the like, as well as the recording medium.

BACKGROUND ART

In a recording disk, such as a hard disk, an optical disk and a magneto optical disk, the recognition and management of the recording position of data is generally performed as follows. Namely, tracks are formed on the recording surface of the recording disk, and each track is divided into sectors. Then, position information which indicates the start position of each sector is recorded onto the recording surface. The position information is a pit or magnetic data, and is recorded onto the recording surface when the recording disk is formatted. After that, when the data is recorded onto the recording surface, the position information is detected, to thereby recognize a position where the data is to be recorded. Moreover, when the data recorded on the recording surface is read, the position information is detected, to thereby recognize a position where the data to be read is recorded.

The recognition and management of the recording position of the data is basically performed in the above manner; however, the specific aspect thereof varies depending on the type of the recording disk or the like.

By the way, a method of recording the data onto the recording medium by using a probe or cantilever or the like which has a sub-micro or nano-scale tip has been recently developed. In such a recording method, there are a method of recording the data by using the spontaneous polarization of a ferroelectric substance, a method of recording the data by making a hole by heat in a polymer film, a method of recording the data by using the charge storage effect of a laminated material which is made of a silicon oxide film, a silicon nitride film, and so on. Moreover, a method of reproducing the data recorded on the recording medium by such a recording method has been also developed. In such a reproducing method, there are a method to which a technology of Scanning Nonlinear Dielectric Microscopy is applied, a method to which a technology of Scanning Maxwell-Stress Microscopy is applied, a method to which a technology of Kelvin Force Microscopy is applied, a method to which a technology of Scanning Capacitance Microscopy is applied, or the like. According to the recording method and the reproducing method described above, it is possible to record the data onto the recording medium at extremely high density, and read and reproduce the recorded data with high resolution. This recording density or reading resolution is beyond the limit of magnetic recording and optical recording.

Even if the method of recording the data onto the recording medium by using the probe or the like is adopted, it is necessary to recognize and manage the recording position of the data, in order to realize the recording and reproduction of the data. A patent reference below (Japanese Patent Application Laying Open NO. Hei 08-321084) discloses a tracking method in an apparatus for recording the data onto a recording medium by using a probe. According to the patent reference, a plurality of tracks are formed, concentrically or spirally (strictly speaking, this is one continuous track if formed spirally), on the recording surface of the disk-shaped recording medium, and grooves for tracking are formed at intervals of several tracks. A recording head is provided with: several probes for recording the data; and two probes only for tracking, and these are aligned in a direction perpendicular to the extension direction of the tracks. Then, the several probes for recording the data are arranged on several tracks which are located between the grooves, and the two probes only for tracking are disposed on the grooves which are located on the both sides of an area formed by the several probes or on the edge of the grooves. When the data is recorded, the recording medium is rotated, and at the same time, the head is displaced in the radial direction of the recording medium so that the several probes for recording the data follow their respective tracks. At this time, tracking control is performed by detecting a shift in the position between the probe only for tracking and the groove.

DISCLOSURE OF INVENTION

According to the method of recording the data onto the recording medium by using the probe or the like, it is possible to improve the recording density and the reading resolution of the data, and it is also possible to increase the data recording capacity of the recording medium. However, if the data recording capacity of the recording medium is increased, the recognition or management of the recording position of the data becomes extensive. For example, the number of tracks and the number of sectors become enormous. Thus, as in conventional recording disks, if the position information is formed on the entire area of the recording surface, the number of the position information becomes enormous. As a result, it takes an extremely long time to perform a format process for recording the position information onto the recording surface. This causes such a disadvantage that the manufacturing operation of the recording medium requires a lot of time, for example.

Moreover, in the conventional technology described in the above-mentioned patent reference, the grooves for tracking are formed at intervals of several tracks, so that if the number of tracks is enormous, then, the number of grooves for tracking is enormous. As a result, if the grooves for tracking are formed in the format process, the format time becomes longer, and the manufacturing operation of the recording medium requires a lot of time. Moreover, if a track pitch is reduced with the increase in the number of tracks, there arises a request to reduce the width of the groove for tracking and the width between the grooves. However, it is uneasy to concentrically or spirally form a groove with an extremely small width.

Furthermore, in the conventional technology described in the above-mentioned patent reference, the groove only for tracking is provided. Thus, there is such a disadvantage that the data cannot be recorded in an area where the groove only for tracking is formed.

Moreover, in the method of recording and reproducing the data by using the probe or the like, such a method has been developed that the head is provided with: a plurality of probe or cantilevers, e.g., several hundreds or several thousands of probes or the like (e.g. multi-probe array) and that the plurality of probes or the like are used to record or reproduce a large amount of data. According to this method, it is possible to speed up the recording or reproduction of the data. If such a method is adopted, the formation of the position information in the entire area of the recording surface of the recording medium causes the complicated recognition process of the position information or complicated position control process between the head and the recording medium, which is a disadvantage.

It is therefore a first object of the present invention to provide a data recording/reproducing apparatus, a data recording/reproducing method, and a recording medium, which enable a reduced format time of the recording medium.

It is a second object of the present invention to provide a data recording/reproducing apparatus, a data recording/reproducing method, and a recording medium, which enable efficient management of data recording position even if the data recording position management is extensive because of the improvement of the recording density of the data and the increase of the recording capacity of the data.

The above object of the present invention can be achieved by a data recording/reproducing apparatus provided with: a recording medium having a recording area to record therein data; a support device disposed in a predetermined position relationship with the recording medium; a first probe, which is supported by the support device, for recording data onto the recording medium or reading data recorded on the recording medium; a second probe, which is supported by the support device, for recording data onto the recording medium or reading data recorded on the recording medium; and a displacement mechanism for relatively displacing the support device with respect to the recording medium, a part of the recording area of the recording medium having a position control area which corresponds to a part or all of a specific range where a tip portion of the first probe can be relatively displaced along with the relative displacement of the support device or which corresponds to a broader range including the specific range, first position information being recorded in a part or all of the position control area.

The above object of the present invention can be also achieved by a recording medium having a recording area to record therein data, wherein the recording area is divided into a plurality of areas which are arranged in a matrix, and at least one of the division areas or a part of at least one of the division areas is a position control area, and position information is recorded in a part or all of the position control area.

The above object of the present invention can be also achieved by a data recording/reproducing method of recording data into a recording area of a recording medium or reproducing data recorded in the recording area of the recording medium, by using a data recording/reproducing apparatus provided with: a first probe and a second probe, each of which is supported by a support device, for recording data onto the recording medium or reading data recorded on the recording medium; and a displacement mechanism for relatively displacing the support device with respect to the recording medium, the data recording/reproducing method provided with: a position information recording process of forming a position control area which corresponds to a part or all of a specific range where a tip portion of the first probe can be relatively displaced along with the relative displacement of the support device or which corresponds to a broader range including the specific range, in a part of the recording area of the recording medium, and of recording position information into a part or all of the position control area; a detecting process of detecting the position information recorded in the position control area of the recording medium, through the first probe; a recording/reading process of recording data into the recording area of the recording medium or reading data recorded in the recording area of the recording medium, through the second probe; and a displacement controlling process of controlling the displacement mechanism in order to set the position relationship between the support device and the recording medium such that the recording of data or the reading of data is performed in the first recording/reading process at a specific position in the recording medium on the basis of the position information detected in the detecting process.

BEST MODE FOR CARRYING OUT THE INVENTION

Figure 1:
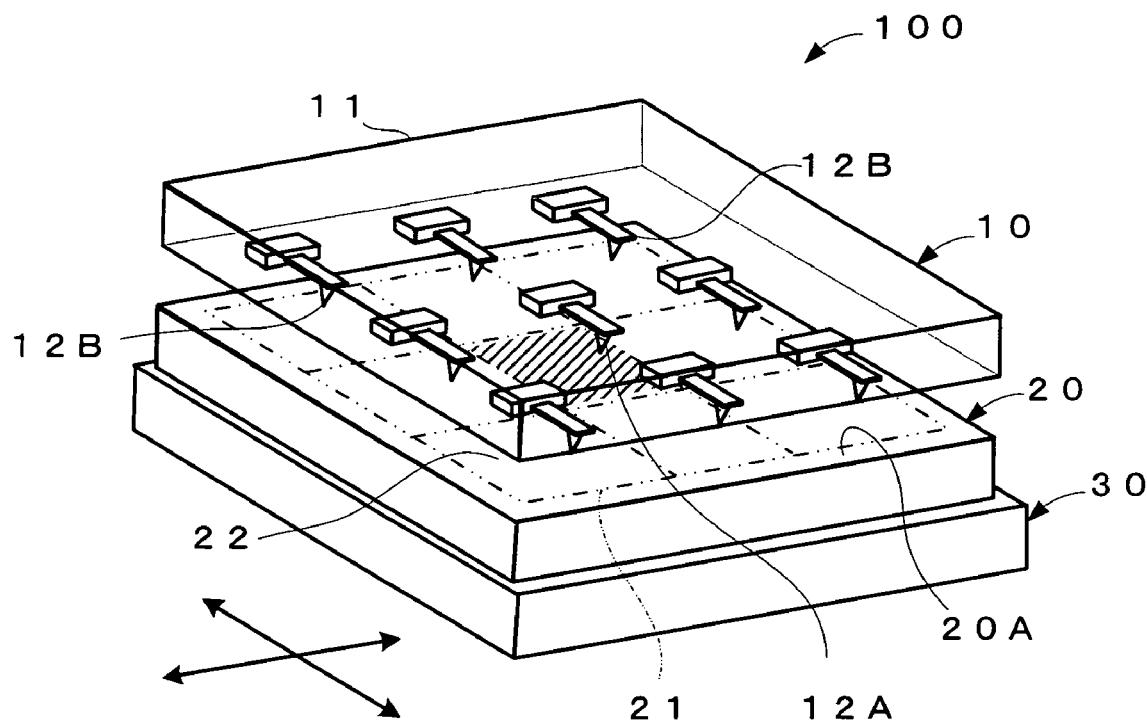
FIG. 1 is a perspective view showing a data recording/reproducing apparatus of the present invention.

The embodiments of the present invention will be explained, with reference to the drawings hereinafter, as the best mode for carrying out the invention. Incidentally, the content illustrated in the drawings used for the explanation of the embodiments embodies the constitutional elements or the like of the data recording/reproducing apparatus in the embodiments of the present invention, for the purpose of explaining technical ideas thereof. The shape, size, position, connection relationship, and the like of the various constitutional elements or the like are not limited to the drawings.

FIG. 1 shows an embodiment of the data recording/reproducing apparatus of the present invention. A data recording/reproducing apparatus 100 in FIG. 1 records data onto a recording medium 20, or reads and reproduces the data recorded on the recording medium 20. The data treated by the data recording/reproducing apparatus 100 includes a computer program, an operation system program, application software, text data, audio data, video data, control data for recording and reproducing operations, and the like. The data recording/reproducing apparatus 100 can be used as a single, independent, and small recording/reproducing apparatus as a whole. Moreover, the data recording/reproducing apparatus 100 can be incorporated onto various apparatuses, such as a computer, an audio apparatus, a control apparatus for automobiles and airplanes, a medical apparatus, and a robot, and can be also made function as a large-capacity storage device of these apparatuses.

The data recording/reproducing apparatus 100 uses cantilevers for the recording/reproduction of the data with respect to the recording medium 20. The data recording/reproducing apparatus 100 can adopt various methods, as a recording/reproducing method which uses the cantilevers. For example, it can adopt, as the data recording method, a method of recording the data by using the spontaneous polarization of a ferroelectric substance, a method of recording the data by making a hole by heat in a polymer film, a method of recording the data by using the charge storage effect of a laminated material which is made of a silicon oxide film, a silicon nitride film, and so on. Moreover, it can adopt, as a method of reproducing the data, a method to which a technology of Scanning Nonlinear Dielectric Microscopy is applied, a method to which a technology of Scanning Maxwell-Stress Microscopy is applied, a method to which a technology of Kelvin Force Microscopy is applied, a method to which a technology of Scanning Capacitance Microscopy is applied, or the like.

As shown in FIG. 1, the data recording/reproducing apparatus 100 is provided with: a head 10; the recording medium 20; and a displacement mechanism 30. The head 10 is provided with: a support device 11; and cantilevers 12A and 12B.

The support device 11 is a member for supporting the cantilevers 12A and 12B, and is formed of a substrate of silicon compounds, glass, metal, or the like. The support device 11 is located in a predetermined relationship with the recording medium 20. In the example shown in FIG. 1, the support device 11 is located above the recording surface of the recording medium 20. Incidentally, FIG. 1 shows the support device 11 in perspective, for convenience of explanation.

Figure 2:
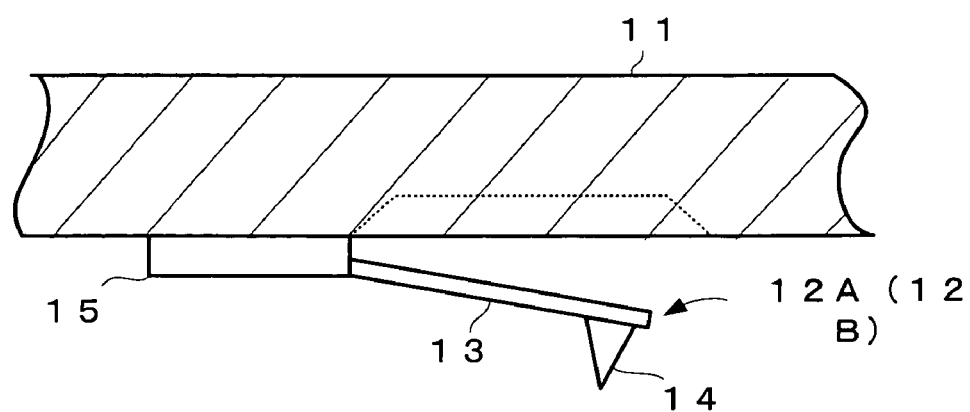
FIG. 2 is a cross sectional view showing the structure of a cantilever provided for the data recording/reproducing apparatus.

The cantilevers 12A and 12B are members, which are supported by the support device 11, for recording the data onto the recording medium 20 or reading the data recorded on the recording medium 20. FIG. 2 shows the cantilever 12A in close-up. The cantilever 12A is provided with: an arm 13; and a needle 14. The arm 13 is supported by the head on the base end thereof through an arm support member 15, and has a free end on the other end. The needle 14 is formed on the other end of the arm 13. The needle 14 extends from the other end of the arm 13 to the recording medium 20, and the diameter of its tip is preferably on the nano or sub-micron order.

The more specific structure of the cantilevers 12A and 12B varies depending on the data recording method or the data reproducing method adopted by the data recording/reproducing apparatus 100. For example, if the method of recording the data by using the spontaneous polarization of a ferroelectric substance is adopted, it is necessary to apply electrical signals to the recording medium 20 from the tip portions of the cantilevers 12A and 12B. Thus, at least the surface of the tip portions of the cantilevers 12A and 12B is preferably an electric conductor. In this case, it is preferable to use a tungsten needle as the needle 14, for example. Moreover, the entire cantilever may be formed of high-dope silicon or conductive diamond. On the other hand, if the method of recording the data by making a hole by heat in a polymer film is adopted, it is necessary to apply electrical signals to the cantilevers 12A and 12B to generate heat in the needle 14. Moreover, in order to detect unevenness (a hole) of the recording surface upon the data reproduction, the arm 13 needs to be elastically bended. In this case, it is preferable to use a cantilever made of high-dope silicon. For example, the cantilever made of high-dope silicon can be formed by a surface micro or nano-machining technology, which uses plasma or chemical wet etching or the like. Moreover, with respect to the cantilevers 12A and 12B, the same cantilevers as those developed in a technology of AFM (Atomic Force Microscope) can be also used.

Incidentally, the member for recording the data onto the recording medium 20 or reading the data recorded on the recording medium 20 is not limited to the cantilever. It may be a needle-shaped probe as a whole. In this case, the probe is disposed such that it is supported by the support device 11 on the base end thereof and that it extends to the recording medium 20 on the other end side thereof. For example, as the probe, it is possible to use a tungsten needle or carbon nanotube.

In the example shown in FIG. 1, the total number of the cantilevers 12A and 12B is nine, and they are arranged in a matrix of 3×3 on the support device 11. Incidentally, the total number of the cantilevers 12A and 12B may be two or more, and it may be several hundreds, several thousands, or even several tens of thousands. Moreover, the arrangement of the cantilevers is not limited to the matrix, but may be two-dimensional arrangement with another type of regularity or without regularity. Furthermore, a plurality of cantilevers may be also aligned to be one dimensional cantilever array. Moreover, it is also possible to determine the arrangement of the cantilevers 12A and 12B, in view of thermal deformation, deformation with time, or the like of the support device 11 or the recording medium 20.

The head 10 and the recording medium 20 are preferably constructed to change a distance between the both, in a direction crossing a recording surface 20A of the recording medium 20 (e.g. in a direction perpendicular to the recording surface 20A). For example, it is preferable to provide a displacement mechanism (different from the displacement mechanism 30 described later) which enables one or both of the head 10 and the recording medium 20 to be displaced in the direction crossing the recording surface 20A of the recording medium 20. By such a displacement mechanism, the tip portions of the cantilever 12A and 12B are made approach or contact the recording surface 20A of the recording medium 20 when the data is recorded onto the recording medium 20 or when the data recorded on the recording medium 20 is read. Incidentally, at this time, whether the tip portions of the cantilever 12A and 12B are made approach or contact the recording surface 20A of the recording medium 20 depends on the recording method or the like. For example, if the method of recording the data by making a hole by heat in a polymer film is adopted, it is necessary to make the tip portions of the cantilever 12A and 12B contact the recording surface 20A of the recording medium 20. On the other hand, if the method of recording the data by using the charge storage effect is adopted, it is not always necessary to make the tip portions of the cantilever 12A and 12B contact the recording surface 20A of the recording medium 20.

The recording medium 20 is a plate-shaped recording medium having the recording surface 20A. In the example shown in FIG. 1, the recording medium 20 is square; however, whether it is square or circular, the external shape of the recording medium is disregarded. The material of the recording medium 20 varies depending on the recording method or reproducing method or the like of the data. If the method of recording the data by using the spontaneous polarization of a ferroelectric substance is adopted, the recording medium 20 is provided with a recording layer made of a ferroelectric material (e.g. Lithium tantalate: $LiTaO_3$, etc.). On the other hand, if the method of recording the data by making a hole by heat in a polymer film is adopted, the recording medium 20 is provided with a recording layer made of a material which can be thermally deformed (e.g. PMMA, etc.).

On the recording surface 20A of the recording medium 20, there is formed a recording area 21 to record therein the data, and in the recording area 21, there is formed a position control area 22A or the like. The details about these will be discussed later.

The displacement mechanism 30 is a mechanism for relatively displacing the support device 11 (head 10) with respect to the recording medium 20. By changing the position relationship between the support device 11 and the recording medium 20 by using the displacement mechanism 30, the position of the tip portions of the cantilevers 12A and 12B are displaced in the recording area 21. By this, it is possible to record the data into various places in the recording area 21. For example, if tracks are formed at intervals of several tens nanometers and data bits are recorded at intervals of several nanometers on the tracks, the displacement mechanism 30 changes the position relationship between the support device 11 and the recording medium 20, with such a nano-scale accuracy.

The displacement mechanism 30 may be constructed to fix the support device 11 and displace the recording medium 20, or maybe constructed to fix the recording medium 20 and displace the support device 11. Alternatively, it may be constructed to displace both the support device 11 and the recording medium 20. The displacement mechanism 30 is preferably constructed to relatively displace one or both of the support device 11 and the recording medium 20, in a first axis direction (X direction) and a second axis direction (Y direction) which cross each other at right angles on the recording surface 20A (refer to arrows in FIG. 1). In this case, the displacement mechanism 30 can be realized by a stage which can be displaced in an X-Y direction, for example. Moreover, as an actuator to realize the displacement, it is possible to use an actuator of an electromagnetic type or an actuator which uses a piezoelectric element, or the like. Incidentally, instead of this, it is also possible to use a displacement mechanism for rotating the recording medium 20. In this case, the displacement mechanism can be realized by a spindle motor.

Figure 3:
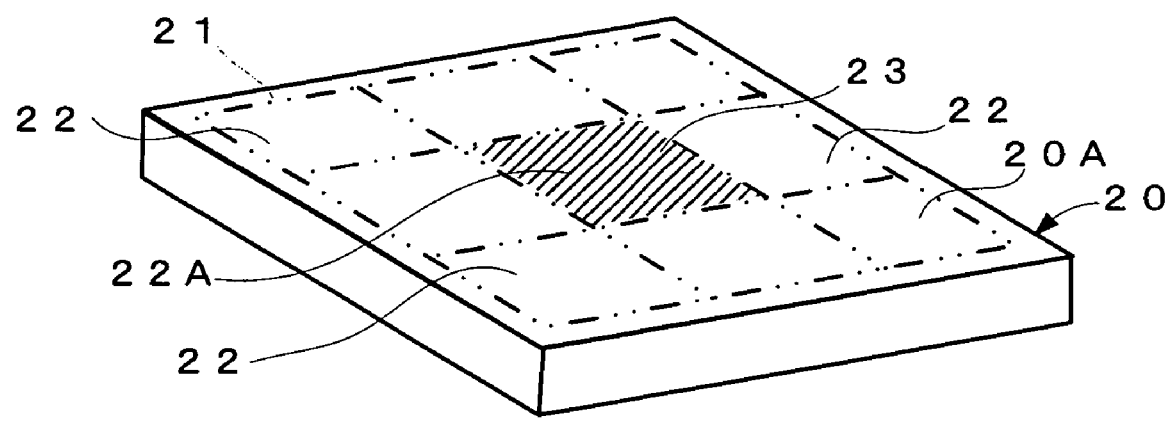
FIG. 3 is a perspective view showing a recording medium of the present invention.

FIG. 3 shows one example of the recording area 21 of the recording medium 20. As shown in FIG. 3, the recording medium 20 has the recording area 21 to record therein the data. The recording area 21 is spread on the recording surface 20A. The recording area 21 is divided into a plurality of areas 22, and the division areas 22 are arranged in predetermined positions.

Figure 4:
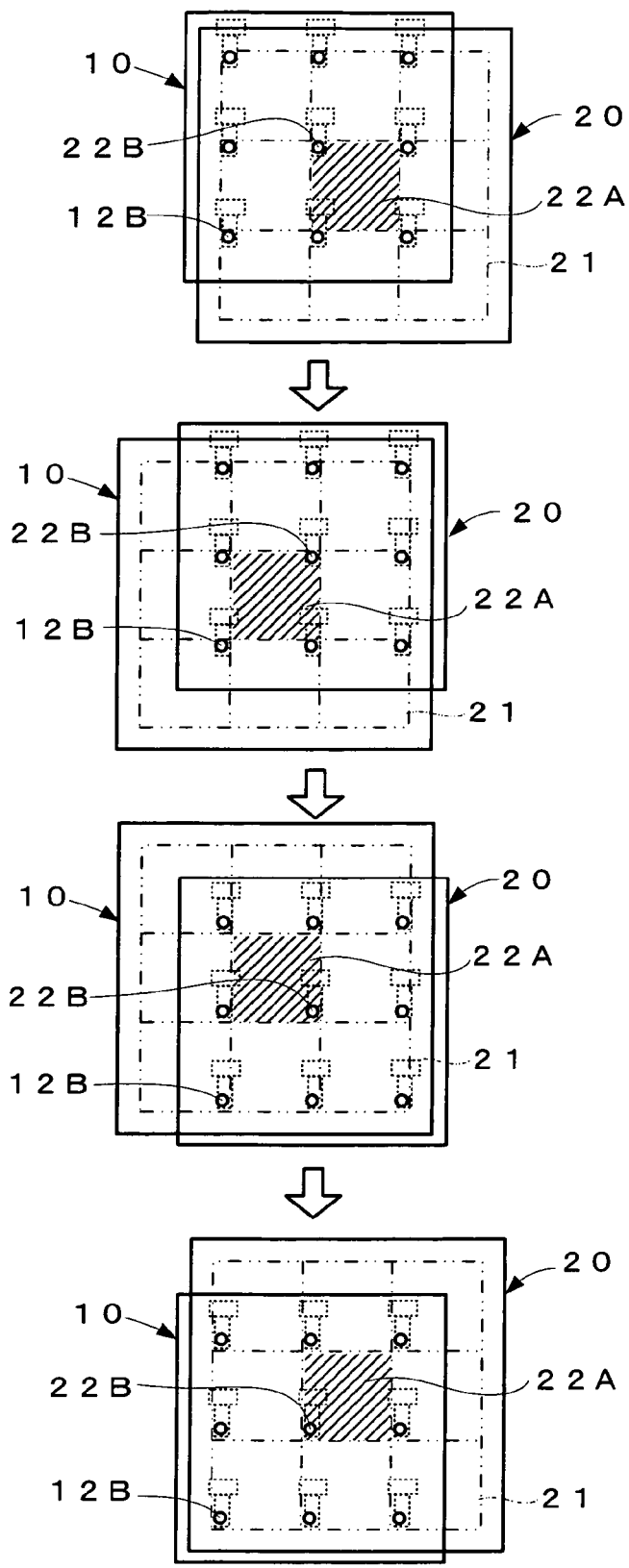
FIG. 4 is an explanatory diagram showing relative displacement of a support member and the recording medium.

The aspect of the division and arrangement of the recording area 21 is determined by considering the number of the cantilevers 12A and 12B, the arrangement of the cantilevers 12A and 12B, the displacement range of the cantilevers 12A and 12B (the relative displacement range of the support device 11 with respect to the recording medium 20), and the like. In the example shown in FIG. 1, the total number of the cantilevers 12A and 12B is nine, and they are arranged in a matrix of 3×3. The cantilevers 12A and 12B are displaced by the displacement mechanism 30 in a displacement range shown in FIG. 4. Therefore, the recording area 21 of the recording medium 20 shown in FIG. 3 is divided into the nine areas 22 in association with the number, arrangement and displacement range of the cantilevers 12A and 12B, and the division areas 22 are arranged in a matrix of 3×3. In this case, the division areas 22 correspond to the respective cantilevers 12A and 12B, one to one. The individual cantilevers 12A and 12B record or read the data, in the respective division areas 22.

Moreover, as shown in FIG. 3, the division area located in the center of the recording area 21 is the position control area 22A. In the position control area 22A, as opposed to the other division areas 22, position information 23 is recorded at an initial stage, e.g., at the time of shipment from a factory of the recording medium 20 or the data recording/reproducing apparatus 100, or at a time point immediately after a user formats the recording medium 20. The position information 23 is information by which the relative position of the support device 11 and the recording medium 20 can be known or recognized.

In the example shown in FIG. 1, the cantilever 12A located in the center of the support device 11 corresponds to the position control area 22A. The position information 23 recorded in the position control area 22A can be detected through the cantilever 12A, and by this, it is possible to know or recognize the position of the cantilever 12A in the position control area 22A. Moreover, since the cantilever 12A is fixed on the support device 11, it is possible to know or recognize the relative position of the support device 11 and the recording medium 20 on the basis of the position of the cantilever 12A in the position control area 22A. Moreover, by this, it is possible to know or recognize the positions of the other cantilevers 12B in the respective division areas 22.

As described above, since the position information is recorded into only a part of the recording area of the recording medium, the number of the position information becomes smaller and a range of forming the position information also becomes smaller, as compared to a case where the position information is recorded over the entire recording area. Therefore, it is possible to reduce a time for an operation of forming the position information onto the recording medium, e.g., the format process of the recording medium. Moreover, it is possible to know or recognize the positions of all the cantilevers in the recording area, only by detecting the position control area where the position information is recorded with one cantilever (or several cantilevers which is a part of all the cantilevers). Thus, it is possible to easily realize the detection of the data recording position or the data reading position, and the position control (e.g. tracking control) of the cantilevers in the recording area.

Figure 5:
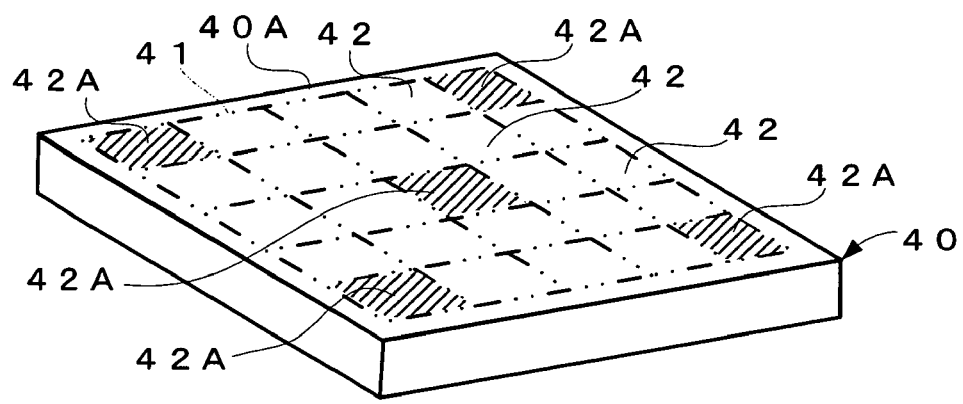
FIG. 5 is a perspective view showing another recording medium of the present invention.

It is possible to adopt various aspects in the division and arrangement of the recording area of the recording medium. For example, FIG. 5 shows another aspect of the recording area of the recording medium. As shown in FIG. 5, a recording area 41 of a recording medium 40 is divided into 25 areas 42, and the division areas 42 are arranged in a matrix of 5×5. Incidentally, if the recording area 41 is divided in this manner, it is preferable to use a head in which 25 cantilevers or probes are arranged in a matrix of 5×5.

Moreover, it is also possible to adopt various aspects in the number, arrangement, area size, external shape, or the like of the position control area. For example, in the example shown in FIG. 5, there are five position control areas 42A in total, and one of them is disposed in the center in the recording area 41, and the remaining four are arranged on the respective four corners of the recording area 41. As described above, the position control area is a part of the recording area, and the position control area may adopt any aspect on the conditions that the position control area corresponds to a part or all of the specific range where the tip portion of a certain cantilever or probe can be relatively displaced along with the relative displacement of the support device, or on the conditions that the position control area corresponds to a larger range including the above-mentioned specific range.

Nevertheless, as shown in FIG. 3, by disposing the position control area 22A in the center in the recording area 21, it is possible to minimize an effect of a shift in the position of the support device 11 or the recording medium 20 on position control (e.g. occurrence of an error in the position control). Namely, in order to normally perform the recording and reading of the data by using the cantilevers 12A and 12B, it is preferable to keep a predetermined distance between the cantilevers 12A and 12B and the recording surface 20A, and in order to do so, it is preferable to keep the support device 11 and the recording medium 20 to be parallel to each other. If the support device 11 or the recording medium 20 is inclined and the support device 11 and the recording medium 20 are not parallel to each other, the distance between the cantilevers 12A and 12B and the recording surface 20A is off the predetermined distance. The degree of this shift is larger in the end portion than in the central portion of the recording area 21. Moreover, there is a possibility that the support device 11 or the recording medium 20 is rotated in a direction parallel to the recording surface 20A so that the both go away from each other. Even in this case, the shift appears more significantly in the end portion than in the central portion of the recording area 21. Therefore, by disposing the position control area 22A in the center of the recording area 21, it is possible to minimize the effect of a shift in the position between the support device 11 and the recording medium 20 on the position control, and thereby increase the detection accuracy of the relative position between the support device 11 and the recording medium 20.

Moreover, as shown in FIG. 5, by arranging the position control areas 42A on the four corners of the recording area 41, it is possible to correct a shift in the position of the support device 11 and the recording medium 40. For example, it is possible to recognize the degree of the shift in the position, such as inclination of the recording medium 40 with respect to the support device 11, by comparing the position information (e.g. intensity of a detection signal) which is individually detected from four cantilevers corresponding to the relative position control areas 42A on the four corners. By displacing the support device 11 or the recording medium 40 on the basis of the recognition result, it is possible to correct the shift in the position of the both. Alternatively, it is possible to electrically correct the intensity of signals detected from the individual cantilevers on the basis of the recognition result. Thus, it is possible to reduce or eliminate the effect of the shift in the position between the support device 11 and the recording medium 40.

Figure 6:
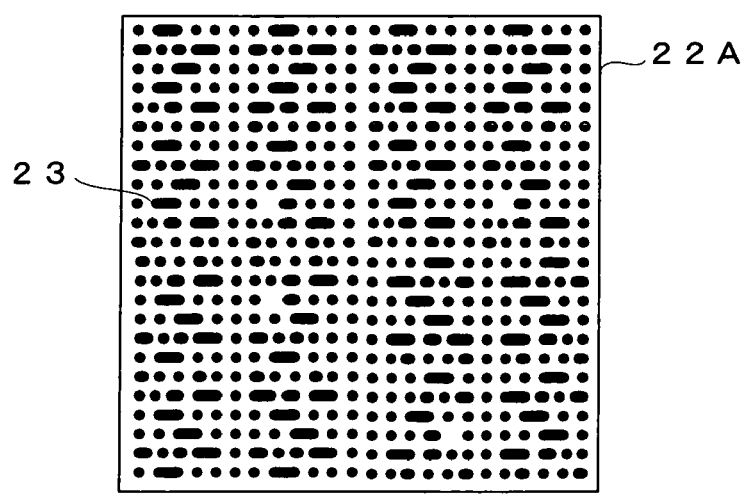
FIG. 6 is a plan view showing one example of position information recorded in a position control area of the recording medium of the present invention.

FIG. 6 shows one example of the position information 23 recorded in the position control area 22A. The position information 23 may be any information if the relative position of the cantilever 12A (support device 11) and the recording medium 20 can be known. For example, in the position control area 22, a mark or pit having a predetermined pattern or shape may be formed as the position information 23. The specific structure of the position information 23 varies depending on the recording method or reading method of the data, or the type of the recording medium. For example, if the method of recording the data by using the spontaneous polarization of a ferroelectric substance is adopted, the mark or pit corresponding to the position information 23 is recorded as the polarization direction of the ferroelectric substance. On the other hand, if the method of recording the data by making a hole by heat in a polymer film is adopted, the mark or pit corresponding to the position information 23 is recorded as a physical hole (concave portion) on the recording surface. Incidentally, in the example shown in FIG. 6, the position information 23 is recorded throughout the entire position control area 22A; however, the position information may be recorded only in a part of the position control area 22A. For example, the position information may be dispersed and recorded at predetermined intervals in the position control area.

Moreover, as for the content of the position information 23, it may be information abstract enough to merely indicate whether or not the cantilever 12A follows the track, for example, or may be information indicating the position of the cantilever 12A in the position control area 22A as numerical values on X-Y coordinates. Alternatively, it may be specific information which directly shows the physical address.

Figure 7:
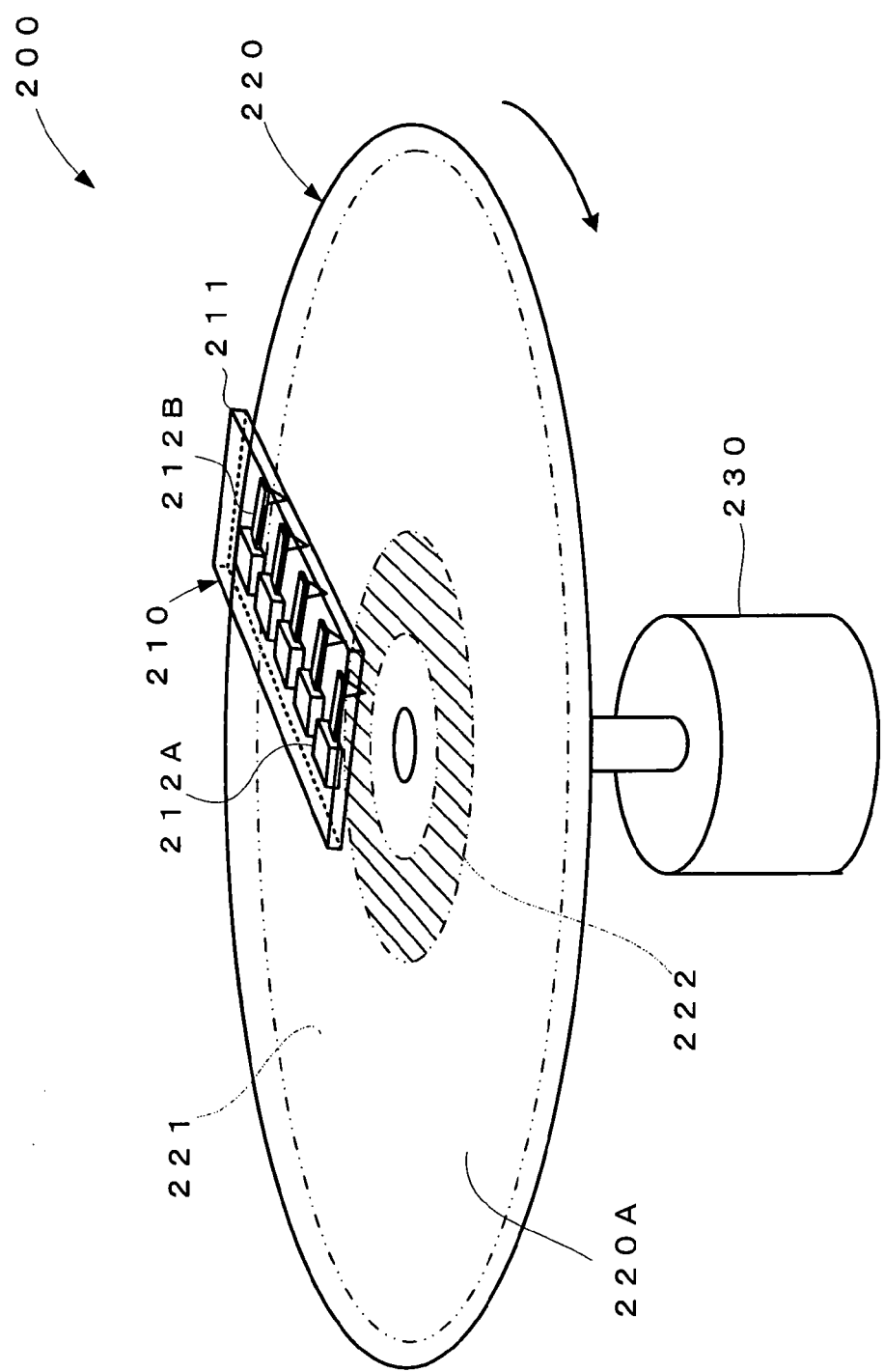
FIG. 7 is a perspective view showing another data recording/reproducing apparatus of the present invention.

FIG. 7 shows another embodiment of the data recording/reproducing apparatus of the present invention. In a data recording/reproducing apparatus 200 in FIG. 7, there are five cantilevers 212A and 212B in total are aligned in a support device 211 of a head 210. Moreover, a recording medium 220 is disk-shaped, and a recording area 221 is formed on its recording surface 220A, and a position control area 222 is formed in the inner circumferential portion of the recording area 221. Then, the position information is recorded at an initial stage in the position control area 222.

The recording medium 220 is rotated by a displacement mechanism 230, such as a spindle motor, in a direction shown by an arrow-indicating-direction in FIG. 7, for example. The support device 210 is displaced by another displacement mechanism in the radial direction of the recording medium 220. The cantilever 212A located on the most inner circumferential side of the recording medium 20 corresponds to the position control area 222. For example, the position control area 222 has dimensions and a shape which match those of the displacement range of the cantilever 212A.

Incidentally, the cantilever 12A in FIG. 1 or the cantilever 212A in FIG. 7 performs a significant function which is different from the cantilevers 12B and 212B, in that the cantilever 12A or 212A reads the position information at least the an early stage. Thus, the cantilevers 12A and 212A may be shaped differently or formed by using different materials from the other cantilevers 12B and 212B, to increase the dimensional accuracy, durability, temperature characteristic, and the like of the cantilevers 12A and 212A. By this, it is possible to improve the reading accuracy of the position information 23 and 223, to thereby increase the accuracy of the position control between the support device and the recording medium.

Figure 8:
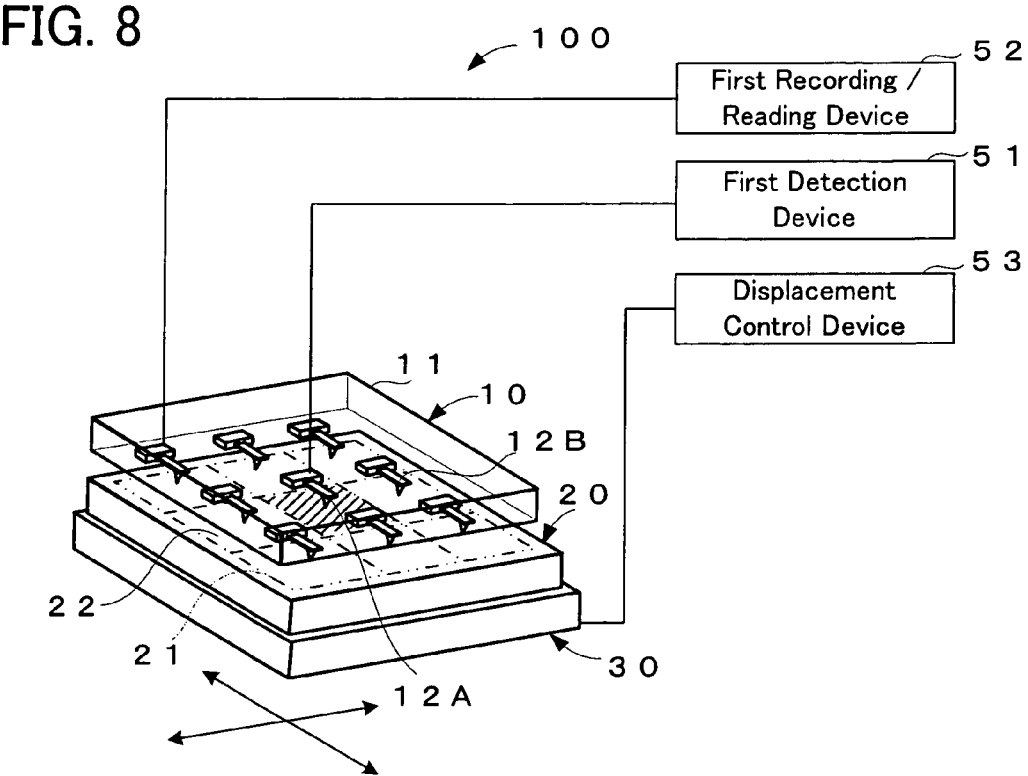
FIG. 8 is a block diagram showing an embodiment related to a signal process of the data recording/reproducing apparatus of the present invention.

FIG. 8 shows an embodiment of construction related to a signal process of the data recording/reproducing apparatus 100. As shown in FIG. 8, the data recording/reproducing apparatus 100 is provided with: a first detection device 51; a first recording/reading device 52; and a displacement control device 53, as the construction related to the signal process thereof The first detection device 51 is a device for detecting the position information 23 recorded in the position control area 22A of the recording medium 20, through the cantilever 12A. The first detection device 51 reads the position information 23 through the cantilever 12A, analyzes the pattern or shape of the mark or pit of the position information 23, and recognizes the position of the cantilever 12A in the position control area 22A. By this, it is possible to know or recognize both the position relationship between the support device 11 and the recording medium 20, and the positions of the cantilevers 12B in the division areas 22. The first detection device 51 is provided with: a circuit for converting a signal obtained through the cantilever 12A to a detection signal suitable for the signal process (e.g. a piezoelectric element, a frequency-voltage conversion circuit, an amplifier circuit, a phase detection circuit, etc.); and an operation process circuit for analyzing the presence, pit patterns or pit shapes of the position information 23 (e.g. a CPU, etc.).

The first recording/reading device 52 is a device for recording the data into the recording area 21 of the recording medium 20 or for reading the data recorded in the recording area 21 of the recording medium 20, through the cantilevers 12B. The recording area 21 which is targeted for the recording and reading by the first recording/reading device 52 is the division areas 22 other than the position control area 22A. Incidentally, in FIG. 8, only one first recording/reading device 52 is illustrated; however, the data recording/reproducing apparatus 100 is actually provided with the first recording/reading devices 52, by the number corresponding to the number of the cantilevers 12B (eight in the example shown in FIG. 8). The individual first recording/reading device 52 may be independently provided for each of the cantilevers 12B. Moreover, as for an element which can be shared, out of the first recording/reading devices 52, there may be provided only a signal member, and this may be shared by the plurality of first recording/reading devices 52. The first recording/reading device 52 is provided with a circuit or the like for converting the data which is received mainly from external equipment, to a signal which is suitable for the recording onto the recording medium 20 (e.g. an amplifier circuit, a pulse signal generation circuit, etc.). Moreover, the first recording/reading device 52 is provided with: a circuit for reproducing the data read from the recording medium 20 (decoder, etc.); a circuit for converting the data to a signal suitable to output it to the external equipment (a frequency-voltage conversion circuit, an amplifier circuit, a phase detection circuit, etc.); or the like.

The displacement control device 53 is a device for controlling the displacement mechanism 30 in order to set the position relationship between the support device 11 and the recording medium 20 such that the recording or reading of the data is performed by the first recording/reading device 52 at a specific position in the recording area 11, on the basis of the position information 23 detected by the first detection device 51. As described above, on the basis of the position information 23 detected by the first detection device 51, it is possible to recognize the position of the cantilever 12A in the position control area 22A. Then, the cantilever 12A and the cantilevers 12B are fixed on the support device 11 and the position relationship between the both can be known in advance, so that it is possible to recognize each of the positions of the cantilevers 12B in the division areas 22, on the basis of the position of the cantilever 12A in the position control area 22A. In such a principle, the displacement control device 53 controls the displacement mechanism 30 on the basis of the position information 23 detected by the first detection device 51, changes the position relationship between the support device 11 and the recording medium 20, and displaces the cantilevers 12B in the division areas 22 to the respective special places (refer to FIG. 4).

By virtue of the structure shown in FIG. 8, it is possible to detect the position information 23 by using the cantilever 12A, and at the same time, it is possible to record and read the data by using the cantilevers 12B. Particularly in the example shown in FIG. 8, it is possible to record and read the data by displacing the eight cantilevers 12B to the respective specific positions at once, on the basis of the position detection performed by the one cantilever 12A. Therefore, it is possible to realize the recording and reading of the data, efficiently.

Moreover, the first recording/reading device 52 may record only the data (so-called content data), such as a computer program, an operation system program, application software, text data, audio data, and video data, into the recording area 21, upon the recording of the data. On the contrary, the first recording/reading device 52 may record not only the above-mentioned content data but also the position information into the recording area 21. Namely, the position information is newly recorded into the division area other than the position control area 22A, by using the cantilever 12B. The position information recorded here indicates the present position of the cantilever 12B in the division area 22. After the recording of the position information, the position information is recorded not only into the position control area 22A but also into another area 22. Therefore, the position information can be detected by using the cantilever 12B. By this, it is possible to recognize the position of the cantilever 12B in the division area 22, and on the basis of this, it is also possible to recognize the positions of the other cantilevers 12B and the cantilever 12A. Incidentally, the position information newly recorded in the division area 22 may be position information which directly indicates the present position of the cantilever 12B; however, it may be the same information as the position information which indicates the present position of the cantilever 12A in the position control area 22A. That is because the relative position relationship between the cantilever 12A and each of the cantilevers 12B is fixed and it is possible to recognize the present positions or the like of the cantilevers 12B in the division areas 22 even on the basis of the same information as the position information which indicates the present position of the cantilever 12A in the position control area 22A.

Figure 9:
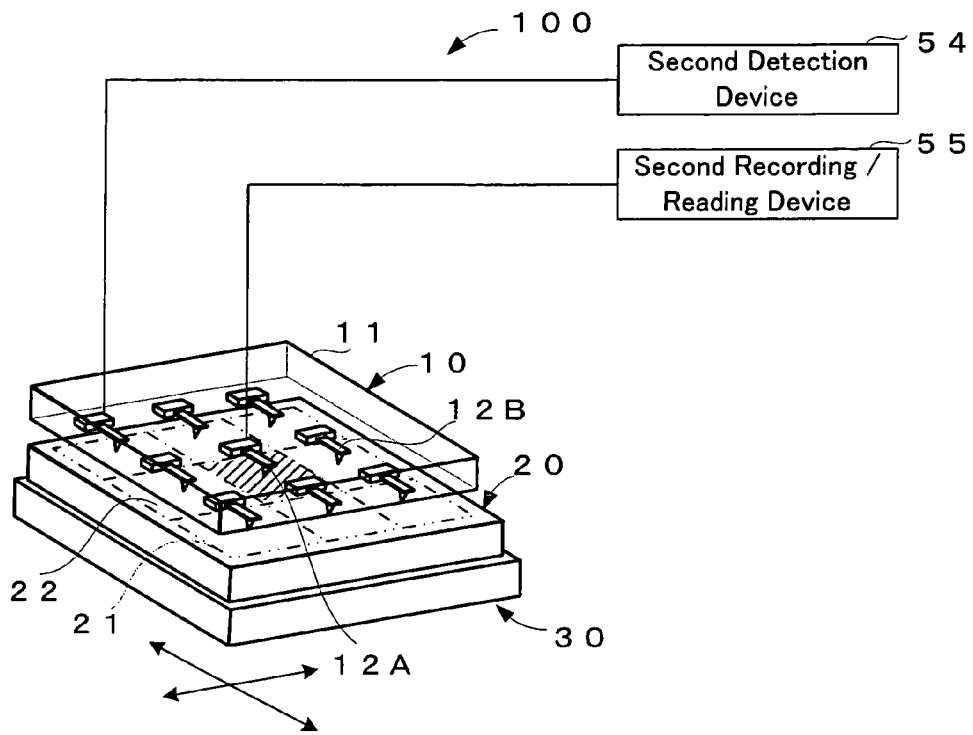
FIG. 9 is a block diagram showing another embodiment related to a signal process of the data recording/reproducing apparatus of the present invention.

Moreover, if such construction that the position information is newly recorded into the division area 22 through the cantilever 12B, it is also possible to add a second detection device 54 and a second recording/reading device 55 to the data recording/reproducing apparatus 100, as shown in FIG. 9.

The second detection device 54 is a device for detecting the position information recorded in the recording area 21 through the cantilever 12B. The second detection device 54 can be realized in the same structure as the first detection device 51.

The second recording/reading device 55 is a device for recording the data into the position control area 22A or reading the data recorded in the position control area 22A, through the cantilever 12A, on the basis of the position information detected by the second detection device 54. The second recording/reading device 55 can be realized in the same structure as the first recording/reading device 52.

After the new position information is recorded by the first recording/reading device 52 shown in FIG. 8 into the division area 22 through the cantilever 12B, it is possible to perform the position control of the cantilevers 12B and 12A, on the basis of the new position information. Thus, even if the position information 23 recorded in advance in the position control area 22A is deleted, that does not make the position control incapable. Thus, after the new position information is recorded by the first recording/reading device 52 into the division area 22 through the cantilever 12B, the position information recorded in the division area 22 is detected by the second detection device 54 shown in FIG. 9, through the cantilever 12B. Then, on the basis of the position information, the content data or the like is recorded into the position control area 22A. At this time, the content data may be written over the position information 23 recorded in advance in the position control area 22A, or may be newly written into a space area which exists in advance in the position control area 22A to leave the position information 23. By this, it is possible to use the position control area 22A as a space to record therein the content data, and in the end, it is possible to record the content data in the entire recording area 21. Moreover, after the content data is recorded into the position control area 22A, the content data can be read and reproduced by the second recording/reading device 53 through the cantilever 12A.

As described above, according to the data recording/reproducing apparatus 100 (200), it is only necessary to record the position information 23 in the position control area 22A at the initial stage, so that it is possible to reduce a time for the format process or the like. Moreover, it is possible to efficiently and easily perform the position control of all the cantilevers 12B, on the basis of only the position information 23 recorded only in the position control area 22A. Furthermore, the new position information can be recorded into the division area 22 through the cantilever 12B, and on the basis of the new position information, the content data can be also recorded into the position control area 22A through the cantilever 12A. By this, it is possible to record the content data into the entire recording area in the end.

Moreover, the data recording/reproducing apparatus in the embodiment of the present invention can be realized by adopting the following data recording/reproducing method, to hardware which has: two or more probes including a first probe and a second probe, each of which is supported by a support device, for recording the data onto a recording medium or reading the data recorded on the recording medium; and a displacement mechanism for relatively displacing the support device with respect to the recording medium. Namely, the data recording/reproducing method is provided with: a position information recording process of forming a position control area which corresponds to a part or all of a specific range where a tip portion of the first probe can be relatively displaced along with the relative displacement of the support device or which corresponds to a broader range including the specific range, in a part of the recording area of the recording medium, and of recording position information into a part or all of the position control area; a detecting process of detecting the position information recorded in the position control area of the recording medium, through the first probe; a recording/reading process of recording data into the recording area of the recording medium or reading data recorded in the recording area of the recording medium, through the second probe; and a displacement controlling process of controlling the displacement mechanism in order to set the position relationship between the support device and the recording medium such that the recording of data or the reading of data is performed in the first recording/reading process at a specific position in the recording medium on the basis of the position information detected in the detecting process.

Next, an example of the present invention will be discussed on the basis of the drawings, as the more detailed best mode of the present invention. The example below is applied to the data recording/reproducing apparatus for performing the thermomechanical recording of the data onto the recording medium and for reading and reproducing the data recorded on the recording medium, by using a cantilever array, and this is one preferable example to implement the present invention.

Figure 10:
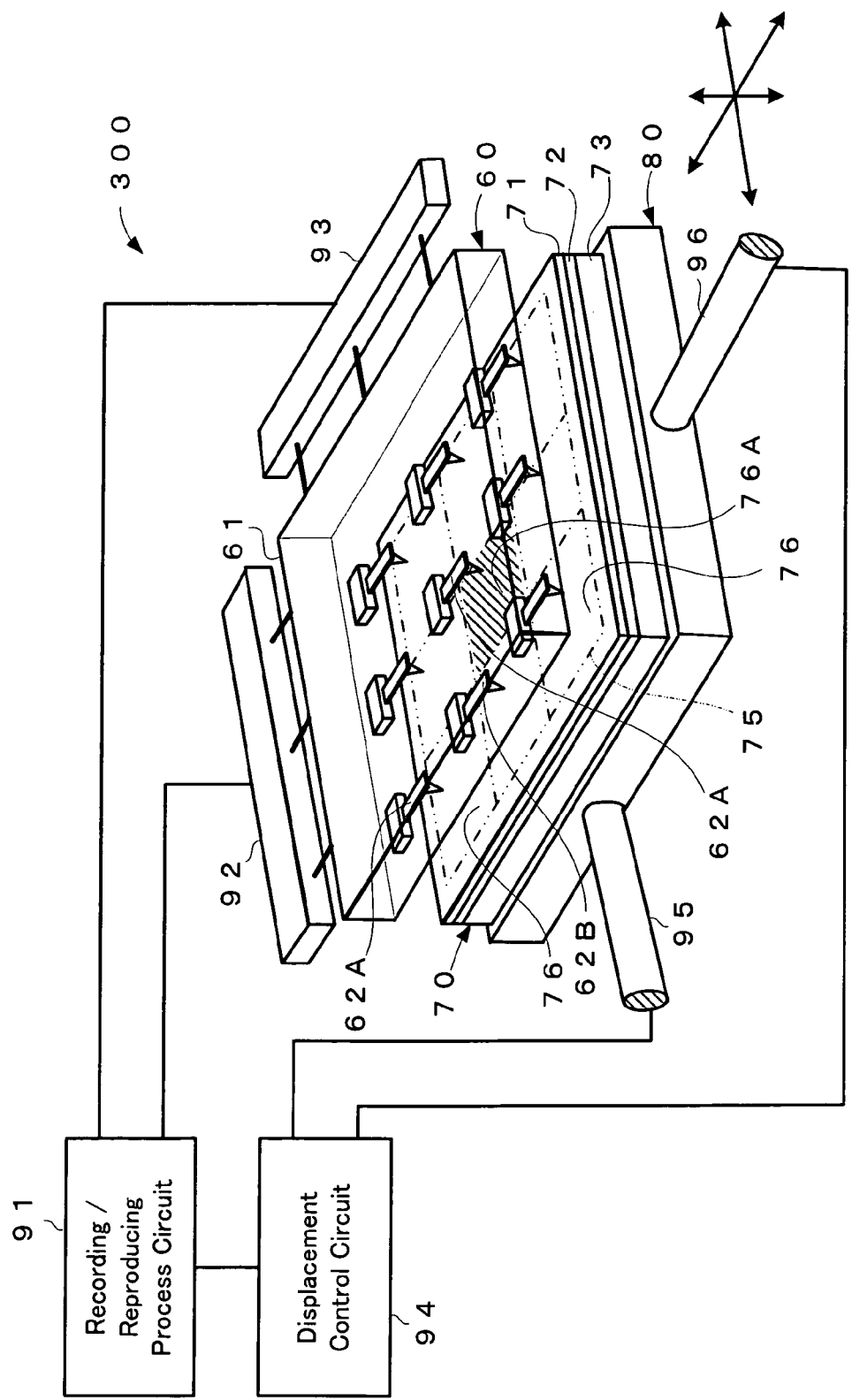
FIG. 10 is a block diagram showing an example of the data recording/reproducing apparatus of the present invention.

FIG. 10 shows a data recording/reproducing apparatus 300 as the example of the present invention. The data recording/reproducing apparatus 300 is provided with: a head 60; a recording medium 70; an X-Y-Z stage 80; a recording/reproducing process circuit 91; and a displacement control circuit 94.

The head 60 is provided with: a support device 61; and cantilevers 62A, 62B, etc. The support device 61 of the head 60 supports the cantilevers 62A, 62B, etc. Specifically, the cantilevers 62A, 62B, etc. are supported on the lower surface of the support device 61. The support device 61 is formed of a substrate of silicon compounds, glass, metal, or the like. The support device 61 is located above the recording surface of the recording medium 70. Incidentally, FIG. 10 shows the support device 61 in perspective, for convenience of explanation; however, the support device 61 is generally not transparent although it may be transparent depending on the selection of materials.

The cantilevers 62A, 62B, etc. are formed of high-dope silicon. Each of the cantilevers 62A, 62B, etc. is provided with an arm and a needle. The arm can be elastically bended. Each of the cantilevers 62A, 62B, etc. is supported by the support device 61 on the base end thereof, and has the needle on the other end of the arm. The needle has a tip several nano to several tens nano meters in diameter. Moreover, there is provided a piezoelectric element for detecting the curvature of the arm, on the surface of the arm. The total number of the cantilevers 62A, 62B, etc. is nine, and they are arranged in a matrix of 3×3 on the support device 61. Incidentally, it is assumed that the total number of the cantilevers 62A, 62B, etc. is nine, for convenience of explanation; however, it is actually several tens to several hundreds.

The recording medium 70 has a square external shape and is plate-shaped. The recording medium 70 is provided with: a first polymer layer 71; a second polymer layer 72; and a silicon substrate 73. The first polymer layer 71 is a layer to record therein the data. The first polymer layer 71 is formed on the second polymer layer 72 which is formed on the silicon substrate 73. The material of the first polymer layer 71 is PMMA (polymethylmethacrylate), for example. The second polymer layer 72 is a layer to prevent abrasion of the needle tip caused by the collision or bump of the cantilevers 62A, 62B, etc. and the recording medium 70 when the tips of the cantilevers 62A, 62B, etc. are pressed onto the recording medium 70. The second polymer layer 72 is formed between the first polymer layer 71 and the silicon substrate 73. The material of the second polymer layer 72 is closslinked photoresist, for example. The silicon substrate 73 is formed of a silicon material which is excellent in heat conduction and heat release. The silicon substrate 73 supports the first polymer layer 71 and the second polymer layer 72, and has a function of promoting the heat release upon recording.

The recording medium 70 has a recording area 75 to record therein the data. The recording area 75 is spread on the recording surface of the recording medium 70. The recording area 75 is divided into nine areas 76, and the division areas 76 are arranged in a matrix of 3×3. The division areas 76 correspond to the respective cantilevers 62A, 62B, etc., one to one, and the division areas 76 substantially match the displacement ranges in the X-Y direction of the respective cantilevers 62A, 62B, etc. (refer to FIG. 4).

The polarization area located in the center of the recording area 75 is a position control area 76A. In the position control area 76A, the position information is recorded in advance. The position information is information by which the relative position of the support device 61 and the recording medium 70 can be known or recognized. Specifically, the information, by which the position of the cantilever 62E in the position control area 76A can be determined, is recorded in advance in the position control area 76 as a physical pit. The position information is recorded in the entire position control area 76A, and patterned so as to determine the position of the cantilever 62E in the position control area 76A, quickly and by a unit of several nano to several tens nano order.

The X-Y-Z stage 80 displaces the recording medium 70 mounted thereon, in the X direction, in the Y direction, and in the Z direction which is perpendicular to the X-Y surface.

On the other hand, the recording/reproducing process circuit 91 is provided with an operation process circuit, a memory circuit, and the like. The recording/reproducing process circuit 91 is electrically connected to the cantilevers 62A, 62B, 62E, etc., through multiplexers 92 and 93. The recording/reproducing process circuit 91 mainly supplies electrical signals corresponding to the data to be recorded onto the recording medium 70, to the cantilevers 62A, 62B, etc., upon the data recording. Moreover, upon the data reproduction, the recording/reproducing process circuit 91 receives the data (detection signals) read by the cantilevers 62A, 62B, etc., and performs the data reproduction process. Moreover, upon the data recording or data reproduction, the recording/reproducing process circuit 91 receives the position information which is read by the cantilever 62E (in some cases, the cantilevers 62A, 62B, etc. other than the cantilever 62E), and supplies this information to the displacement control circuit 94. Furthermore, the recording/reproducing process circuit 91 has a function of combining the position information with the content data to be recorded onto the recording medium 70, upon the data recording.

The displacement control circuit 94 is provided with an operation process circuit, a memory circuit, and the like. The displacement control circuit 94 is electrically connected to the recording/reproducing process circuit 91 so that the data can be exchanged between the both. Moreover, the displacement control circuit 94 is connected to the X-Y-Z stage 80 through actuators 95 and 96. The displacement control circuit 94 detects the positions of the cantilevers 62A, 62B, etc. (cantilever 62E) in the division areas 76 (position control area 76A), on the basis of the position information supplied from the recording/reproducing process circuit 91. Furthermore, the displacement control circuit 94 controls the X-Y-Z stage 80 on the basis of the detection result or the like, displaces the recording medium 70 in the X-Y direction, and displaces the cantilevers 62A, 62B, etc. in the division areas 76 to desired positions. Moreover, the displacement control circuit 94 controls the X-Y-Z stage 80 at the start of the data recording or data reproduction, displaces the recording medium 70 in the Z direction, and makes the tips of the needles of the cantilevers 62A, 62B, etc. contact the recording surface of the recording medium 70.

The data recording operation of the data recording/reproducing apparatus 300 is as follows. At first, the displacement control circuit 94 displaces the recording medium 70 in the X-Y direction, and displaces the cantilevers 62A, 62B, etc. to recording start positions. Then, the displacement control circuit 94 displaces the recording medium 70 in the Z direction, and makes the tips of the needles of the cantilevers 62A, 62B, etc. contact the recording surface of the recording medium 70. At this time, the needles of the cantilevers 62A, 62B, etc. are pressed by the recording surface, so that force is applied through the needles to the tip portions of the arms of the cantilevers 62A, 62B, etc. Thus, the arms are mildly bended. Then, the recording/reproducing process circuit 91 applies the electrical signals corresponding to the data to be recorded, to the cantilevers 62A, 62B, etc. The application of the electrical signals causes heat at a temperature of about 400 degree Celsius, for example, in the needles of the cantilevers 62A, 62B, etc., to thereby soften the first polymer layer under the needles. Then, due to the elastic forces of the arms, the tips of the needles penetrate into the first polymer layer 71, to thereby form pits (holes or concave portions) in the first polymer layer 71. Such a recording operation is repeated along with the displacement in the X-Y direction of the recording medium 70, and the data to be recorded is recorded into the first polymer layer 71.

At the start of the recording operation and during the recording operation, the displacement control circuit 94 controls the X-Y-Z stage 80 and displaces the recording medium 70 in the X-Y direction, to thereby control the recording position of the data. The displacement control circuit 94 controls the recording position of the data, on the basis of the position information recorded in advance in the position control area 76A (incidentally, the control of the recording position of the data includes tracking control and control of displacing the needles of the cantilevers to specific recording positions). Namely, the position information is formed in advance as a physical pit (hereinafter referred to as a "position pit") in the position control area 76A. If the displacement of the recording medium 70 in the X-Y direction causes the needle of the cantilever 62E to be displaced onto the position pit, the needle of the cantilever 62E goes (falls) into the position pit, which results in the milder bending deformation of the arm. The change in the bending of the arm is detected by the piezoelectric element provided on the surface of the arm, and is supplied to the recording/reproducing process circuit 91 as a detection signal. The recording/reproducing process circuit 91 reproduces the position information on the basis of the detection signal, and supplies the reproduced position information to the displacement control circuit 94. Then, the displacement control circuit 94 displaces the recording medium 70 in the X-Y direction on the basis of the supplied position information, and performs the positioning of the cantilevers 62A, 62B, etc.

In such a recording operation, the cantilever 62E is used only to read the position information. The recording of the data is performed by the other cantilevers 62A, 62B, etc., other than the cantilever 62E.

Moreover, the position information (position pit) recorded in the position control area 76A is not only read by the cantilever 62E and used for the displacement control performed by the displacement control circuit 94. The position information recorded in the position control area 76A is supplied by the recording/reproducing process circuit 91 to the cantilevers 62A, 62B, etc., other than the cantilever 62E, as a part of the data to be recorded. Namely, in the recording operation, not only the content data but also the position information, which corresponds to the recording position where the content data is recorded, are recorded into the division areas 76. As a result, the position information is recorded only in the position control area 76A at the initial stage, but after the data recording operation, the position information is also recorded into the division areas 76 other than the position control area 76A, in a mixture form with the content data.

Moreover, after the position information is recorded into a part or all of the division areas 76 other than the position control area 76A, the position information recorded in the division areas 76 is read by using the cantilevers 62A, 62B, etc. other than the cantilever 62E, and on the basis of this, the displacement control of the recording medium 70 and the positioning of the cantilevers 62A, 62B, etc. are performed. In this case, in the recording operation, the content data is supplied to the cantilever 62E, and the content data is recorded (overwritten) in the position control area 76A by the cantilever 62E. Namely, before the position information is recorded with the content data into the division areas 76 other than the position control area 76A, the cantilever 62E is used only to read the position information; however, after the position information is recorded with the content data into the division areas 76 other than the position control area 76A, the cantilever 62E is used to record the content data, as with the other cantilevers 62A, 62B, etc. Moreover, before the position information is recorded with the content data into the division areas 76 other than the position control area 76A, the position control area 76A is an area to be used for the position control; however, after the position information is recorded with the content data into the division areas 76 other than the position control area 76A, the position control area 76A is used to record therein the content data, as in the other division areas 76.

On the other hand, the data reproduction operation of the data recording/reproducing apparatus 300 is as follows. At first, the displacement control circuit 94 displaces the recording medium 70 in the X-Y direction, and displaces the cantilevers 62A, 62B, etc. to reading start positions. Then, the displacement control circuit 94 displaces the recording medium 70 in the Z direction, and makes the tips of the needles of the cantilevers 62A, 62B, etc. contact the recording surface of the recording medium 70. At this time, the needles of the cantilevers 62A, 62B, etc. are pressed by the recording surface, so that the arms of the cantilevers 62A, 62B, etc. are mildly bended. Then, the displacement control circuit 94 displaces the recording medium 70 in the X-Y direction.

At a stage after the above-mentioned recording operation, the content data including the position information is recorded as the pits. If the displacement in the X-Y direction of the recording medium 70 causes the cantilevers 62A, 62B, etc. to be displaced onto the pits, the needles of the cantilevers 62A, 62B, etc. go (fall) into the pits, which results in the milder bending deformation of the arms. The changes in the bending of the arms are detected by the piezoelectric element and supplied to the recording/reproducing process circuit 91 as detection signals. The recording/reproducing process circuit 91 extracts the position information and the content data from the detection signals, supplies the extracted position information to the displacement control circuit 94, and reproduces the content data. Moreover, the displacement control circuit 94 controls the displacement in the X-Y direction of the recording medium 70, on the basis of the position information supplied from the recording/reproducing process circuit 91, and performs the positioning of the cantilevers 62A, 62B, etc., i.e. the control of the reading position of the data (incidentally, the control of the reading position includes tracking control and control of displacing the needles of the cantilevers to specific reading positions).

Furthermore, if the content data is recorded into the position control area 76A by the above-mentioned recording operation, it is also possible to reproduce the content data which is recorded in the position control area 76A, by the reproduction operation.

As described above, according to the data recording/reproducing apparatus 300, only by recording the position information in advance in the position control area 76A as being a part of the recording area 75, it is possible to perform the position control of all the cantilevers 62A, 62B, etc., on all the division areas 76, i.e. on the entire recording area 75. Therefore, upon the manufacturing the recording medium 70 or formatting of the recording medium 70, it is possible to reduce a time to record the position information onto the recording medium 70 (e.g. format time). By this, it is possible to reduce a time for the manufacturing operation of the recording medium 70, and moreover, if the formatting is entrusted to a user, it is possible to improve the usability of the recording medium 70 and the data recording/reproducing apparatus 300.

Moreover, according to the data recording/reproducing apparatus 300, the reading of the position information and the recording of the data can be independently performed by using different cantilevers or different circuits, so that it is possible to make the data recording, highly accurate, fast, and simple.

Moreover, in the data recording operation, the position information is added to the content data and is recorded into the division areas 76 other than the position control area 76A, so that after the data recording operation is performed, it is possible to perform the position control of the cantilevers 62A, 62B, etc., on the basis of the position information which is recorded into the division areas 76 other than the position control area 76A. Therefore, it is possible to realize the position control of the cantilevers in various aspects.

Furthermore, the content data is recorded even into the position control area 76A through the cantilever 62E while the position control or displacement control is performed on the basis of the position information recorded in the division areas 76 other than the position control area 76A. Thus, in the end, it is possible to use the entire recording area 75 for the recording of the content data, and it is possible to effectively use the recording area.

In the present invention, various changes may be made, if desired, without departing from the essence or spirit of the invention which can be read from the claims and the entire specification. A data recording/reproducing apparatus, a data recording/reproducing method, a recording medium, and a computer program which can realize these functions, all of which involves such changes, are also intended to be within the technical scope of the present invention.

INDUSTRIAL APPLICABILITY

The present invention can be applied to a data recording/reproducing apparatus for and a data recording/reproducing method of recording data onto a recording medium or reproducing the data recorded on the recording medium by using a probe, cantilever, or the like, as well as the recording medium.

The invention claimed is:

1. A data recording/reproducing apparatus comprising:
a recording medium having a recording area to record therein data;
a support device disposed in a predetermined position relationship with the recording medium;
a first probe, which is supported by the support device, for recording data onto the recording medium or reading data recorded on the recording medium;
a second probe, which is supported by the support device, for recording data onto the recording medium or reading data recorded on the recording medium; and
a displacement mechanism for relatively displacing the support device with respect to the recording medium,
a part of the recording area of the recording medium having a position control area which corresponds to a part or all of a specific range where a tip portion of the first probe can be relatively displaced along with the relative displacement of the support device or which corresponds to a broader range including said specific range, first position information being recorded in a part or all of the position control area,
the recording area of the recording medium being divided into a plurality of areas which are arranged in a matrix, the position control area being at least one of the division areas or a part of at least one of the division areas,
the position control area being formed in a central portion of the recording area of the recording medium.

2. The data recording/reproducing apparatus according to claim 1, wherein the displacement mechanism changes the position relationship between the support device and the recording medium so as to relatively displace the first probe and the second probe in a first axis direction and in a second axis direction which cross each other at a right angle on a surface of the recording medium.

3. The data recording/reproducing apparatus according to claim 1, further comprising:
- a first detecting device for detecting the first position information recorded in the position control area of the recording medium, through the first probe;
- a first recording/reading device for recording data into the recording area of the recording medium or reading data recorded in the recording area of the recording medium, through the second probe; and
- a displacement controlling device for controlling the displacement mechanism in order to set the position relationship between the support device and the recording medium such that the recording of data or the reading of data is performed by the first recording/reading device at a specific position in the recording medium on the basis of the first position information detected by the first detecting device.

4. A data recording/reproducing apparatus comprising:
- a recording medium having a recording area to record therein data;
- a support device disposed in a predetermined position relationship with the recording medium;
- a first probe, which is supported by the support device, for recording data onto the recording medium or reading data recorded on the recording medium;
- a second probe, which is supported by the support device, for recording data onto the recording medium or reading data recorded on the recording medium;
- a displacement mechanism for relatively displacing the support device with respect to the recording medium;
- a position control area which is formed in a part of the recording area of the recording medium, which corresponds to a part or all of a specific range where a tip portion of the first probe can be relatively displaced along with the relative displacement of the support device or which corresponds to a broader range including said specific range, and in a part or all of which first position information is recorded;
- a first detecting device for detecting the first position information recorded in the position control area of the recording medium, through the first probe;
- a first recording/reading device for recording data into the recording area of the recording medium or reading data recorded in the recording area of the recording medium, through the second probe; and
- a displacement controlling device for controlling the displacement mechanism in order to set the position relationship between the support device and the recording medium such that the recording of data or the reading of data is performed by the first recording/reading device at a specific position in the recording medium on the basis of the first position information detected by the first detecting device,
- the first recording/reading device recording second position information into the recording area of the recording medium, through the second probe, and
- the position control area being formed in a central portion of the recording area of the recording medium.

5. The data recording/reproducing apparatus according to claim 4, further comprising:
- a second detecting device for detecting the second position information recorded in the recording area of the recording medium, through the second probe; and
- a second recording/reading device for recording data into the position control area of the recording medium or reading data recorded in the position control area of the recording medium, through the first probe, on the basis of the second position information detected by the second detecting device.

6. The data recording/reproducing apparatus according to claim 4, wherein the first position information and the second position information have same content.

7. The data recording/reproducing apparatus according to claim 1, wherein the first probe or the second probe is a needle-shaped member which is supported by the support device on base end side thereof and which extends to the recording medium on the other end side thereof.

8. The data recording/reproducing apparatus according to claim 1, wherein the first probe or the second probe is a cantilever.

9. The data recording/reproducing apparatus according to claim 1, wherein the total number of the first probe and the second probe is equal to or greater than two, and the first probe and the second probe form a one-dimensional or two-dimensional probe array.

10. The data recording/reproducing apparatus according to claim 1, wherein the total number of the first probe and the second probe is equal to or greater than four, and the first probe and the second probe are arranged in a matrix on the support device.

11. The data recording/reproducing apparatus according to claim 1, wherein the recording medium has a recording layer made of a ferroelectric material.

12. The data recording/reproducing apparatus according to claim 1, wherein the recording medium has a recording layer which can be thermally deformed.

13. A recording medium having a recording area to record therein data, wherein the recording area is divided into a plurality of areas which are arranged in a matrix, and at least one of the division areas or a part of at least one of the division areas is a position control area, and position information is recorded in a part or all of the position control area, and
wherein the position control area is disposed in a central portion of the recording medium.

14. The recording medium according to claim 13, having a recording layer made of a ferroelectric material.

15. The recording medium according to claim 13, having a recording layer which can be thermally deformed.

16. A data recording/reproducing method of recording data into a recording area of a recording medium or reproducing data recorded in the recording area of the recording medium, by using a data recording/reproducing apparatus comprising: a first probe and a second probe, each of which is supported by a support device, for recording data onto the recording medium or reading data recorded on the recording medium; and a displacement mechanism for relatively displacing the support device with respect to the recording medium,
the data recording/reproducing method comprising:
- a position information recording process of forming a position control area which corresponds to a part or all of a specific range where a tip portion of the first probe can be relatively displaced along with the relative displacement of the support device or which corresponds to a broader range including said specific range, in a part of the recording area of the recording medium, and of recording position information into a part or all of the position control area;

a detecting process of detecting the position information recorded in the position control area of the recording medium, through the first probe;

a recording/reading process of recording data into the recording area of the recording medium or reading data recorded in the recording area of the recording medium, through the second probe; and a displacement controlling process of controlling the displacement mechanism in order to set the position relationship between the support device and the recording medium such that the recording of data or the reading of data is performed in the first recording/reading process at a specific position in the recording medium on the basis of the position information detected in the detecting process, the recording area of the recording medium being divided into a plurality of areas which are arranged in a matrix, the position information recording process forming the position control area in at least one of the division areas or in a part of at least one of the division areas, the position information recording process disposing the position control area in a central portion of the recording medium of the recording medium.

* * * * *